US 12,055,680 B2

(12) United States Patent
Wenren et al.

(10) Patent No.: US 12,055,680 B2
(45) Date of Patent: Aug. 6, 2024

(54) OPTICAL IMAGING LENS ASSEMBLY

(71) Applicant: Zhejiang Sunny Optical Co., Ltd, Ningbo (CN)

(72) Inventors: Jianke Wenren, Ningbo (CN); Yuhao Wang, Ningbo (CN); Fujian Dai, Ningbo (CN); Liefeng Zhao, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 961 days.

(21) Appl. No.: 17/027,170

(22) Filed: Sep. 21, 2020

(65) Prior Publication Data

US 2021/0003826 A1 Jan. 7, 2021

Related U.S. Application Data

(63) Continuation of application No. PCT/CN2019/102149, filed on Aug. 23, 2019.

(30) Foreign Application Priority Data

Dec. 24, 2018 (CN) .......................... 201811583073.2

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC ...... G02B 13/00; G02B 9/64; G02B 13/0045; G02B 13/18
See application file for complete search history.

(56) References Cited

U.S. PATENT DOCUMENTS

| | | | | |
|---|---|---|---|---|
| 5,543,970 A | * | 8/1996 | Hata | G02B 15/144105 359/713 |
| 6,008,950 A | * | 12/1999 | Kimura | G02B 13/02 359/651 |
| 8,599,495 B1 | | 12/2013 | Tsai et al. | |
| 2011/0115963 A1 | * | 5/2011 | Sueyoshi | G02B 13/04 348/340 |
| 2016/0033742 A1 | | 2/2016 | Huang | |

(Continued)

FOREIGN PATENT DOCUMENTS

| CN | 107621683 A | 1/2018 |
|---|---|---|
| CN | 107942493 | 4/2018 |

(Continued)

OTHER PUBLICATIONS

First Examination Report issued in corresponding Indian Patent Application No. 202017039484; mailed Aug. 27, 2021; 7 pages.

*Primary Examiner* — Balram T Parbadia
(74) *Attorney, Agent, or Firm* — HAUPTMAN HAM, LLP

(57) ABSTRACT

An optical imaging lens assembly includes a first lens, a second lens, a third lens, a fourth lens, a fifth lens, a sixth lens and a seventh lens, which have refractive power and are sequentially arranged from an object side to an image side of the optical imaging lens assembly along an optical axis. The first lens and the third lens both have positive refractive power. The fifth lens has negative refractive power. A total effective focal length f of the optical imaging lens assembly and an entrance pupil diameter EPD of the optical imaging lens assembly satisfy f/EPD<1.3.

13 Claims, 9 Drawing Sheets

(56) References Cited

U.S. PATENT DOCUMENTS

| | | | | |
|---|---|---|---|---|
| 2016/0124191 A1* | 5/2016 | Hashimoto | ........ | G02B 13/0045 |
| | | | | 359/708 |
| 2017/0139186 A1 | 5/2017 | Tang et al. | | |
| 2017/0254987 A1 | 9/2017 | Lai et al. | | |
| 2017/0336607 A1* | 11/2017 | Nakano | ................ | G02B 13/146 |
| 2019/0310448 A1* | 10/2019 | Hashimoto | ........ | G02B 13/0045 |

FOREIGN PATENT DOCUMENTS

| | | |
|---|---|---|
| CN | 108051902 A | 5/2018 |
| CN | 108227120 | 6/2018 |
| CN | 108535843 A | 9/2018 |
| CN | 108732724 A | 11/2018 |
| CN | 108873255 | 11/2018 |
| CN | 108873256 A | 11/2018 |
| CN | 108873272 | 11/2018 |
| CN | 109031628 | 12/2018 |
| CN | 109358415 A | 2/2019 |
| CN | 209327659 U | 8/2019 |
| JP | 2014032329 | 2/2014 |
| JP | 2015072403 A | 4/2015 |
| JP | 5951912 B1 | 7/2016 |

\* cited by examiner

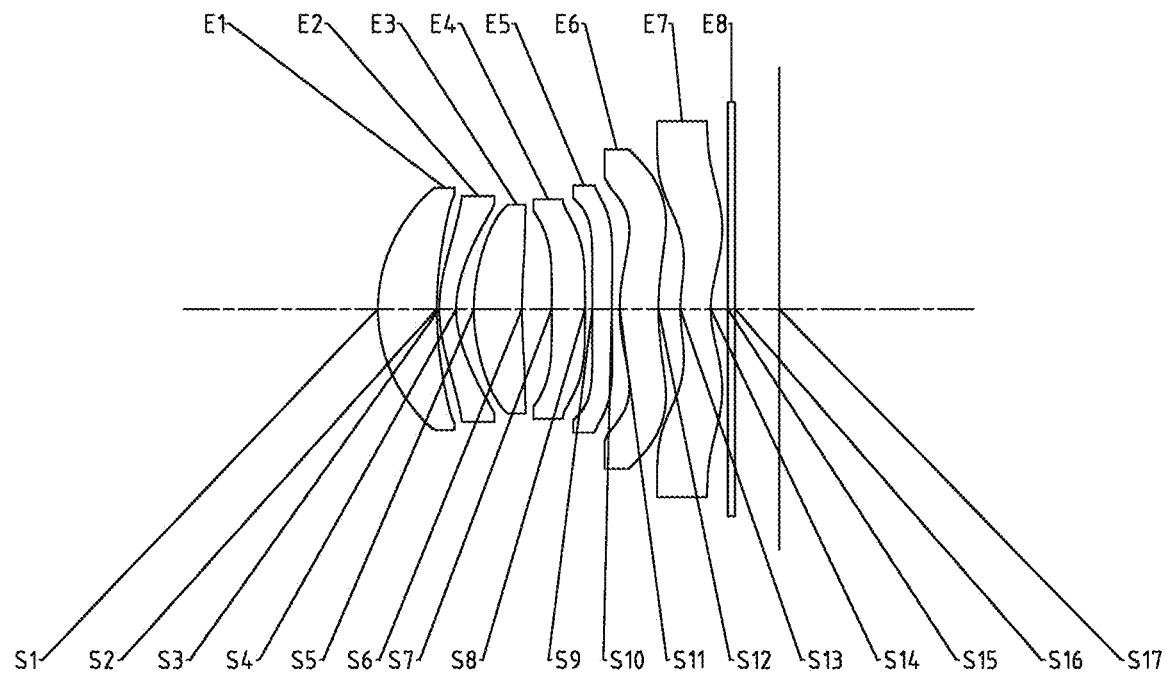
Fig. 1
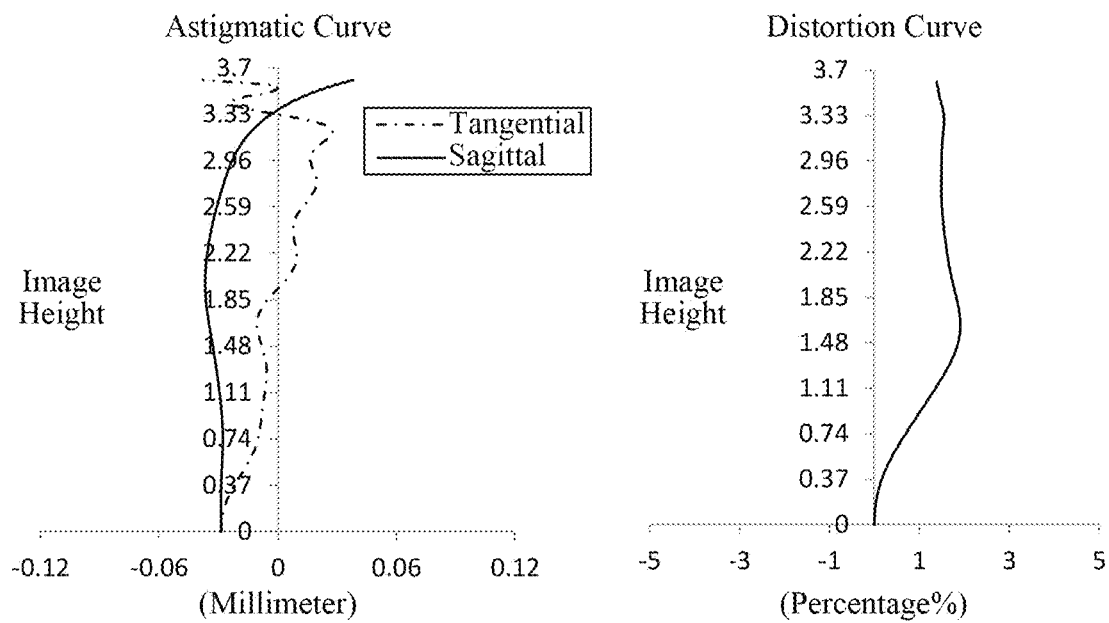
Fig. 2A
Fig. 2B

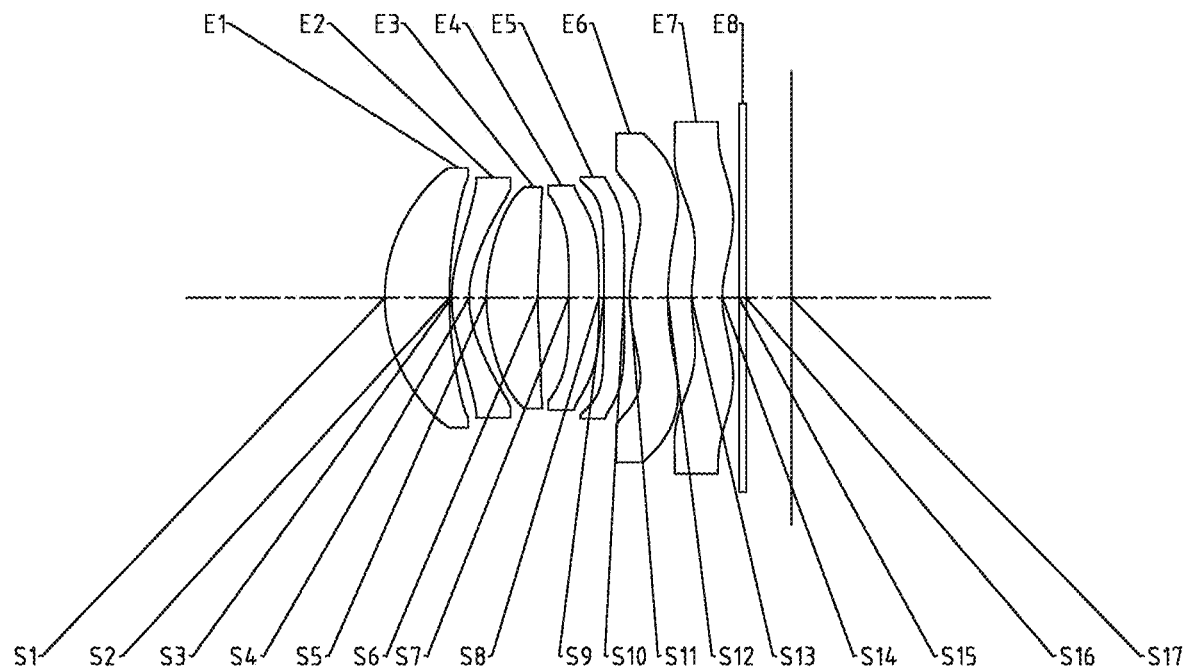
Fig. 5
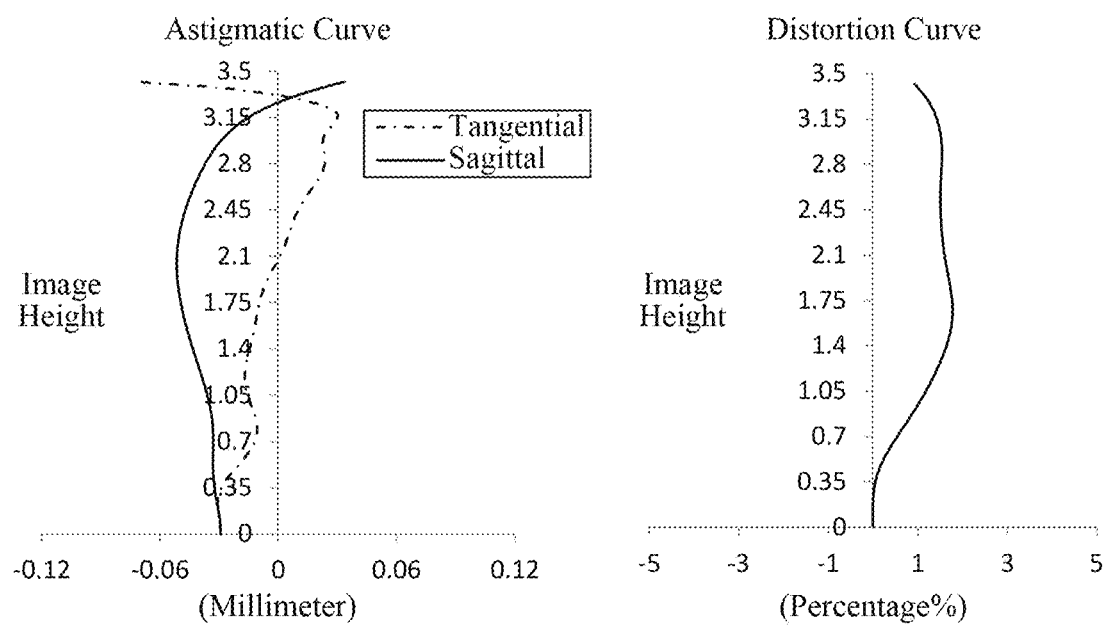
Fig. 6A
Fig. 6B

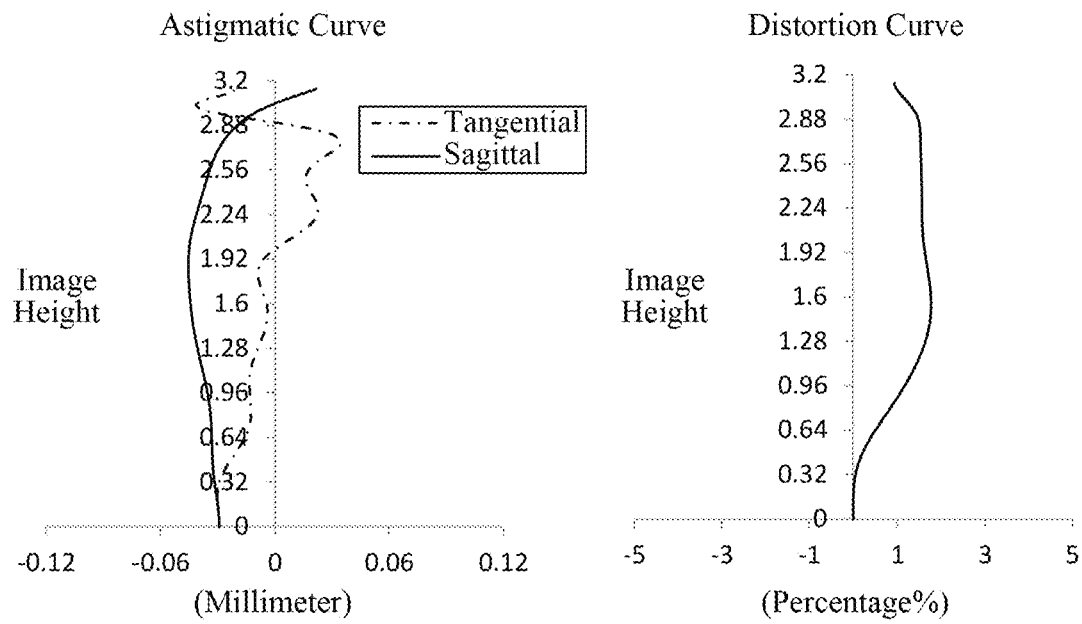
Fig. 8A
Fig. 8B
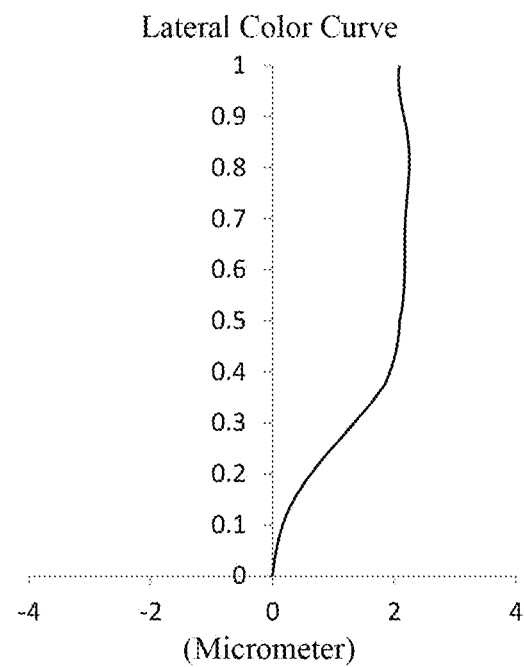
Fig. 8C

OPTICAL IMAGING LENS ASSEMBLY

CROSS-REFERENCE TO RELATED APPLICATIONS

The present patent application is a continuation of International Application No. PCT/CN2019/102149, filed on Aug. 23, 2019, which claims priority to Chinese Patent Application No. 201811583073.2, filed before the China National Intellectual Property Administration (CNIPA) on Dec. 24, 2018. Both of the aforementioned patent applications are hereby incorporated by reference in their entireties.

TECHNICAL FIELD

The present disclosure relates to an optical imaging lens assembly, and more specifically, relates to an optical imaging lens assembly including seven lenses.

BACKGROUND

With the advancement of technology and the rapid development of electronic products, such as smart phones and the like, the imaging requirements for smart phones to take pictures are also increasing continuously. At present, the imaging lens assemblies mounted on electronic products, such as smart phones and the like, are no longer limited to a single-camera, but have gradually developed into multi-cameras. A combination of wide-angle lens assembly and telephoto lens assembly may be employed in most advanced camera lenses, to achieve the function of optical zoom.

However, at present, the simple or basic zoom function may no longer satisfy people's demand for taking pictures with large imaging areas and high image quality. The lens assembly with a large imaging area and a large aperture may collect more light information and possess a lower optical aberration and a better imaging quality. Further, such lens assembly may allow users to choose the aperture size independently, and thus it is gradually favored by users.

SUMMARY

The present disclosure provides an optical imaging lens assembly, such as a lens assembly with a large aperture and large imaging area, that is applicable to portable electronic products and at least solves or partially addresses at least one of the above disadvantages of the prior art.

The present disclosure provides an optical imaging lens assembly that include a first lens, a second lens, a third lens, a fourth lens, a fifth lens, a sixth lens and a seventh lens, which have refractive power and are sequentially arranged from an object side to an image side of the optical imaging lens assembly along an optical axis. The first lens and the third lens both have positive refractive power and the fifth lens has negative refractive power.

In one embodiment, a total effective focal length f of the optical imaging lens assembly and an entrance pupil diameter EPD of the optical imaging lens assembly may satisfy f/EPD<1.3.

In one embodiment, half of a diagonal length ImgH of an effective pixel area on an imaging plane of the optical imaging lens assembly and the total effective focal length f of the optical imaging lens assembly may satisfy 0.6<ImgH/f<0.8.

In one embodiment, an effective focal length f1 of the first lens, a radius of curvature R1 of an object-side surface of the first lens, and a radius of curvature R2 of an image-side surface of the first lens may satisfy 1<f1/(R2−R1)<2.

In one embodiment, a radius of curvature R3 of an object-side surface of the second lens and a radius of curvature R4 of an image-side surface of the second lens may satisfy 1.2<R3/R4<1.6.

In one embodiment, an effective focal length f3 of the third lens, a radius of curvature R6 of an image-side surface of the third lens, and a radius of curvature R5 of an object-side surface of the third lens may satisfy 1.2<f3/(R6−R5)<1.7.

In one embodiment, an effective focal length f2 of the second lens and an effective focal length f7 of the seventh lens may satisfy 0.7<f2/f7<1.3.

In one embodiment, an effective focal length f6 of the sixth lens, an effective focal length f5 of the fifth lens, and an effective focal length f4 of the fourth lens may satisfy 0.5<(f6−f5)/f4<1.0.

In one embodiment, a radius of curvature R11 of an object-side surface of the sixth lens, a radius of curvature R12 of an image-side surface of the sixth lens, a radius of curvature R13 of an object-side surface of the seventh lens, and a radius of curvature R14 of an image-side surface of the seventh lens may satisfy 1.4<(R11+R12)/(R13+R14)<2.1.

In one embodiment, a maximum effective radius DT11 of an object-side surface of the first lens, a maximum effective radius DT12 of an image-side surface of the first lens, and half of a diagonal length ImgH of an effective pixel area on an imaging plane of the optical imaging lens assembly may satisfy 1<(DT11+DT12)/ImgH<1.5.

In one embodiment, an edge thickness ET7 of the seventh lens and a center thickness CT7 of the seventh lens along the optical axis may satisfy 1.2<ET7/CT7<1.7.

In one embodiment, a spaced interval T34 between the third lens and the fourth lens along the optical axis and a spaced interval T67 between the sixth lens and the seventh lens along the optical axis may satisfy 1.1<T34/T67<1.5.

In one embodiment, a center thickness CT3 of the third lens along the optical axis, a center thickness CT6 of the sixth lens along the optical axis, and a distance TTL along the optical axis from an object-side surface of the first lens to an imaging plane of the optical imaging lens assembly may satisfy 2<(CT3+CT6)/TTL*10<2.4.

In one embodiment, the second lens and the seven lens both have negative refractive power, and the fourth lens and the sixth lens both have positive refractive power.

In one embodiment, object-side surfaces of the first lens, the second lens, the third lens, the sixth lens and the seventh lens are convex surfaces, and image-side surfaces thereof are concave surfaces.

The present disclosure employs seven lenses, and the above optical imaging lens assembly has at least one beneficial effect such as large imaging area, large aperture, and high image quality and the like by rationally configuring the refractive power of each lens, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens assembly according to Example 1 of the present disclosure;

FIGS. 2A to 2C illustrate an astigmatic curve, a distortion curve, and a lateral color curve of the optical imaging lens group of the Example 1, respectively;

FIG. 5 illustrates a schematic structural view of an optical imaging lens assembly according to Example 3 of the present disclosure;

FIGS. 6A to 6C illustrate an astigmatic curve, a distortion curve, and a lateral color curve of the optical imaging lens group of the Example 3, respectively;

FIGS. 8A to 8C illustrate an astigmatic curve, a distortion curve, and a lateral color curve of the optical imaging lens group of the Example 4, respectively;

DETAILED DESCRIPTION OF EMBODIMENTS

Figure 2C:
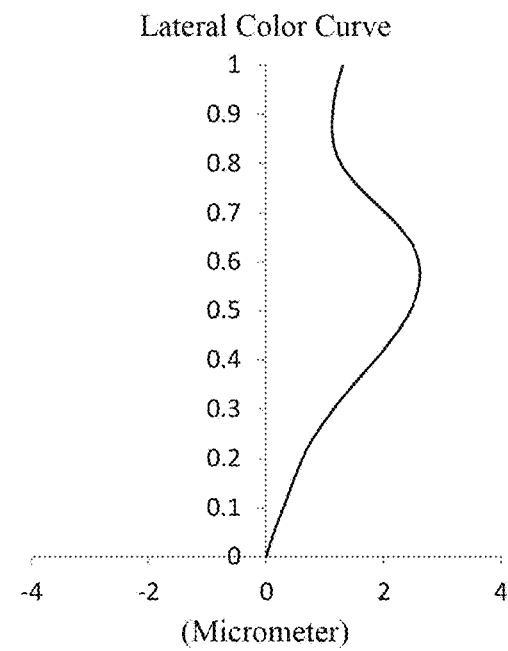

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power; the second lens has positive or negative refractive power; the third lens may have positive refractive power; the fourth lens has positive or negative refractive power; the fifth lens may have negative refractive power; the sixth lens has positive or negative refractive power; and the seventh lens has positive or negative refractive power. When the first lens has positive refractive power, the light passing through the first lens may be converged and it is possible to achieve a lens assembly with a large imaging area and a large aperture. When the third lens has positive refractive power, the optical path difference of the lights in various wavebands generated by the first lens and the second lens may be effectively corrected, the light may be converged and the total reflection may be prevented. When the fifth lens has negative refractive power, the optical zoom may be adjusted, such that it is possible to image on a large imaging area, and the curve of the chief ray angle (CRA) of the optical imaging lens assembly may be controlled effectively to match with a chip having a large imaging area.

In an exemplary embodiment, an object-side surface of the first lens may be convex surface, and an image-side surface of the first lens may be concave surface.

In an exemplary embodiment, the second lens may have negative refractive power, an object-side surface of the second lens may be convex surface, and an image-side surface of the second lens may be concave surface. When the second lens has negative refractive power, the optical path difference generated by the first lens may be effectively corrected, the chromatic aberration of the optical imaging lens assembly may be compensated, and the light may be deflected for obtaining a large imaging area.

In an exemplary embodiment, an object-side surface of the third lens may be convex surface, and an image-side surface of the third lens may be concave surface.

In an exemplary embodiment, the fourth lens may have positive refractive power, an object-side surface of the fourth lens may be convex surface, and an image-side surface of the fourth lens may be convex surface. When the fourth lens has positive refractive power, the light passing through the fourth lens may be further converged after being converged by the third lens. At the same time, the relative brightness at the edge field of view may be improved by recurving the edge of the lens surface.

In an exemplary embodiment, an object-side surface of the fifth lens may be a concave surface, and an image-side surface of the fifth lens may be a concave surface.

In an exemplary embodiment, the sixth lens may have positive refractive power, an object-side surface of the sixth lens may be convex surface, and image-side surface of the sixth lens may be concave surface. When the sixth lens has positive refractive power, the optical path difference generated by the fifth lens may be effectively corrected, the chromatic aberration of the optical imaging lens assembly may be compensated, and enable the optical imaging lens assembly have the ability of field curvature correction.

In an exemplary embodiment, the seventh lens may have negative refractive power, an object-side surface of the seventh lens may be convex surface and image-side surface of the seventh lens may be concave surface. When the seventh lens has negative refractive power, the chromatic aberration of the optical imaging lens assembly may be compensated, the curvature of field and optical distortion may be corrected, and imaging quality may be improved.

In addition, by properly configuring the surface shapes of the first, second, third, sixth and seventh lenses, the incident angle and exit angle of the light in each lens may be adjusted reasonably, and the matching degree between the chip and the chief ray angle of the optical imaging lens assembly may be increased. Meanwhile, it is possible to prevent the total reflection ghost image from being generated due to the excessive light deflection angle.

In an exemplary embodiment, the optical imaging lens assembly according to the present disclosure may satisfy: f/EPD<1.3, where f is a total effective focal length of the optical imaging lens assembly, and EPD is an entrance pupil diameter of the optical imaging lens assembly. More specifically, f and EPD may further satisfy: 1.0<f/EPD<1.3, for example, 1.03≤f/EPD≤1.29. By satisfying the conditional expression f/EPD<1.3, the optical imaging lens assembly may possess a large aperture, the imaging effect of the optical imaging lens assembly in a weak-light environment may be enhanced, and the aberration at the edge field-of-view may be reduced.

In an exemplary embodiment, the optical imaging lens assembly according to the present disclosure may satisfy: 0.6<ImgH/f<0.8, where ImgH is half of a diagonal length of an effective pixel area on the imaging plane of the optical imaging lens assembly, and f is the total effective focal length of the optical imaging lens assembly. More specifically, ImgH and f may further satisfy: 0.67≤ImgH/f≤0.75. By satisfying the conditional expression 0.6<ImgH/f<0.8, the telephoto ratio of the optical lens assembly may be effectively improved, the magnification power may be increased, and the size of the field-of-view may be controlled to increase the imaging range of the lens.

In an exemplary embodiment, the optical imaging lens assembly according to the present disclosure may satisfy: 1<f1/(R2−R1)<2, where f1 is an effective focal length of the first lens, R1 is a radius of curvature of the object-side surface of the first lens, and R2 is a radius of curvature of the image-side surface of the first lens. More specifically, f1, R2, and R1 may further satisfy 1.01≤f1/(R2−R1)≤1.91. By satisfying the conditional expression 1<f1/(R2−R1)<2, the total focal length of the lens assembly may be effectively increased, and the refractive power of the first lens may be reasonably allocated, such that the processing sensitivity of the parts of the lens assembly is reduced. Alternatively, the object-side surface of the first lens may be convex surface, and the image-side surface of the first lens may be concave surface.

In an exemplary embodiment, the optical imaging lens assembly according to the present disclosure may satisfy: 1.2<R3/R4<1.6, where R3 is a radius of curvature of the object-side surface of the second lens, and R4 is a radius of curvature of the image-side surface of the second lens. More specifically, R3 and R4 may further satisfy: 1.36≤R3/R4≤1.39. By satisfying the conditional expression 1.2<R3/R4<1.6, the curvatures of the object-side and image-side surfaces of the second lens may be optimized, the formability of the lenses may be improved, the axial chromatic aberration of the optical lens assembly may be reduced, and the optical Modulation Transfer Function (MTF) value at the off-axis filed may be improved, so as to meet higher imaging requirements.

In an exemplary embodiment, the optical imaging lens assembly according to the present disclosure may satisfy: 1.2<f3/(R6−R5)<1.7, where f3 is an effective focal length of the third lens, R6 is a radius of curvature of the image-side surface of the third lens, and R5 is a radius of curvature of the object-side surface of the third lens. More specifically, f3, R6, and R5 may further satisfy: 1.32≤f3/(R6−R5)≤1.55. By satisfying the conditional expression 1.2<f3/(R6−R5)<1.7, the optical path difference of the lights in various wavebands generated by the second lens having negative refractive power may be effectively corrected, and the refractive power of the third lens may be reasonably allocated, such that the processing sensitivity of the respective parts of the lens assembly is reduced. Alternatively, the object-side surface of the third lens may be convex surface, and the image-side surface of the third lens may be concave surface.

In an exemplary embodiment, the optical imaging lens assembly according to the present disclosure may satisfy: 0.7<f2/f7<1.3, where f2 is an effective focal length of the second lens, and f7 is an effective focal length of the seventh lens. More specifically, f2 and f7 may further satisfy: 0.77≤f2/f7≤1.28. By satisfying the conditional expression 0.7<f2/f7<1.3, it is beneficial to adjust the value of the effective focal length of the optical lens assembly. Further, the distortion at the edge of the optical lens assembly may be reduced effectively, which ensure the relative brightness at the edge, thereby enabling the system to possess a better imaging effect.

In an exemplary embodiment, the optical imaging lens assembly according to the present disclosure may satisfy: $0.5<(f6-f5)/f4<1.0$, where f6 is an effective focal length of the sixth lens, f5 is an effective focal length of the fifth lens, and f4 is an effective focal length of the fourth lens. More specifically, f6, f5, and f4 may further satisfy: $0.68 \leq (f6-f5)/f4 \leq 0.86$. By satisfying the conditional expression $0.5<(f6-f5)/f4<1.0$, it is possible to balance the contribution weight of the fourth, fifth and sixth lenses in the focal length of the entire optical lens assembly, reduce the sensitivity of the entire lens assembly, and enables the optical lens assembly to possess a relatively superior ability of correcting the curvature of field.

In an exemplary embodiment, the optical imaging lens assembly according to the present disclosure may satisfy: $1.4<(R11+R12)/(R13+R14)<2.1$, where R11 is a radius of curvature of the object-side surface of the sixth lens, R12 is a radius of curvature of the image-side surface of the sixth lens, R13 is a radius of curvature of the object-side surface of the seventh lens, and R14 is a radius of curvature of the image-side surface of the seventh lens. More specifically, R11, R12, R13, and R14 may further satisfy: $1.49 \leq (R11+R12)/(R13+R14) \leq 2.00$. By satisfying the conditional expression $1.4<(R11+R12)/(R13+R14)<2.1$, the optical lens assembly may better match the chief ray angle of the chip, correct the curvature of field thereof and increase the relative brightness thereof.

In an exemplary embodiment, the optical imaging lens assembly according to the present disclosure may satisfy: $1<(DT11+DT12)/ImgH<1.5$, where DT11 is a maximum effective radius of the object-side surface of the first lens, DT12 is a maximum effective radius of the image-side surface of the first lens, and ImgH is half of a diagonal length of an effective pixel area on the imaging plane of the optical imaging lens assembly. More specifically, DT11, DT12, and ImgH may further satisfy: $1.01 \leq (DT11+DT12)/ImgH \leq 1.32$. By satisfying the conditional expression $1<(DT11+DT12)/ImgH<1.5$, it is possible to ensure that the lens assembly possess a larger focal length, increase the size of the aperture, and control the range of the depth-of-field, so as to satisfy more shooting requirements.

In an exemplary embodiment, the optical imaging lens assembly according to the present disclosure may satisfy: $1.1<T34/T67<1.5$, where T34 is a spaced interval between the third lens and the fourth lens along the optical axis, and T67 is a spaced interval between the sixth lens and the seventh lens along the optical axis. More specifically, T34 and T67 may further satisfy: $1.16 \leq T34/T67 \leq 1.36$. By satisfying the conditional expression $1.1<T34/T67<1.5$, the optical lens assembly may possess better dispersion correcting ability. Also, the effective focal length may be reasonably controlled by adjusting the optical path over the spaced interval between adjacent lenses.

In an exemplary embodiment, the optical imaging lens assembly according to the present disclosure may satisfy: $1.2<ET7/CT7<1.7$, where ET7 is an edge thickness of the seventh lens, and CT7 is a center thickness of the seventh lens along the optical axis. More specifically, ET7 and CT7 may further satisfy: $1.26 \leq ET7/CT7 \leq 1.63$. By satisfying the conditional expression $1.2<ET7/CT7<1.7$, it is possible to control the light deflection effectively and to reduce the size of the rear end of the optical lens assembly. Meanwhile, configuring the seventh lens to have a smaller thickness-to-thin ratio is also conducive to the formation of the lens, avoids the formation of weld marks, and may reduce the stress issues generated during the forming process.

In an exemplary embodiment, the optical imaging lens assembly according to the present disclosure may satisfy: $2<(CT3+CT6)/TTL*10<2.4$, where CT3 is a center thickness of the third lens along the optical axis, CT6 is a center thickness of the sixth lens along the optical axis, and TTL is a distance along the optical axis from the object-side surface of the first lens to an imaging plane of the optical imaging lens assembly. More specifically, CT3, CT6, and TTL may further satisfy: $2.13 \leq (CT3+CT6)/TTL*10 \leq 2.20$. By satisfying the conditional expression $2<(CT3+CT6)/TTL*10<2.4$, the size of the front and rear ends of the optical lens assembly may be reasonably distributed, so that each lens has a reasonable center thickness to prevent the lenses from cracking after forming. Meanwhile, the lens assembly may further have a better ability to correct field curvature.

In an exemplary embodiment, the above-mentioned optical imaging lens assembly may further include a stop to improve the imaging quality of the lens assembly. Alternatively, the stop may be provided between the object side and the first lens.

Alternatively, the above-mentioned optical imaging lens assembly may further include a filter for correcting the color deviation and/or a protective glass for protecting the photosensitive element located on an imaging plane.

The optical imaging lens assembly according to the above-mentioned embodiment of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the optical imaging lens assembly is more advantageous for production processing and may be applied to portable electronic products. The optical imaging lens assembly configured as described above may also have the characteristics of large imaging area, large aperture, high imaging quality, and the like.

In the embodiment of the present disclosure, at least one of the surfaces of each lens is aspheric. That is, at least one of the object-side surface and the image-side surface of each lens among the first lens, the second lens, the third lens, the fourth lens, the fifth lens, the sixth lens, and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Alternatively, the object-side surface and the image-side surface of each lens among the first lens, the second lens, the third lens, the fourth lens, the fifth lens, the sixth lens, and the seventh lens both are aspheric.

However, it will be understood by those skilled in the art that the number of lenses constituting the optical imaging lens assembly may be varied to achieve the various results and advantages described in this specification without departing from the technical solution claimed by the present disclosure. For example, although the example is described by taking seven lenses as an example, the optical imaging lens assembly is not limited to include seven lenses. The optical imaging lens assembly may also include other numbers of lenses if desired.

Some specific examples of an optical imaging lens assembly applicable to the above-mentioned embodiment will be further described below with reference to the accompanying drawings.

EXAMPLE 1

An optical imaging lens assembly according to example 1 of the present disclosure is described below with reference to FIG. 1 to FIG. 2C. FIG. 1 shows a schematic structural view of the optical imaging lens assembly according to example 1 of the present disclosure.

As shown in FIG. 1, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Refractive index | Abbe number | Conic coefficient |
|---|---|---|---|---|---|---|
| OBJ | Spherical | Infinite | Infinite | | | |
| STO | Spherical | Infinite | −0.8811 | | | |
| S1 | Aspheric | 2.4304 | 0.9097 | 1.55, | 56.1 | −0.1854 |
| S2 | Aspheric | 6.0203 | 0.0369 | | | 0.6301 |
| S3 | Aspheric | 2.1275 | 0.2600 | 1.68 | 19.2 | −11.2524 |
| S4 | Aspheric | 1.5294 | 0.2729 | | | −3.5287 |
| S5 | Aspheric | 2.8088 | 0.7439 | 1.55 | 56.1 | −0.4513 |
| S6 | Aspheric | 8.2758 | 0.4586 | | | −89.3743 |
| S7 | Aspheric | 54.1733 | 0.5140 | 1.55 | 56.1 | 36.9125 |
| S8 | Aspheric | −26.0727 | 0.1115 | | | 99.0000 |
| S9 | Aspheric | −22.8009 | 0.3000 | 1.68 | 19.2 | −93.4078 |
| S10 | Aspheric | 18.0796 | 0.1231 | | | −99.0000 |
| S11 | Aspheric | 2.7471 | 0.5984 | 1.61 | 28.3 | −0.9070 |
| S12 | Aspheric | 4.7458 | 0.3365 | | | −83.0525 |
| S13 | Aspheric | 2.2625 | 0.4673 | 1.55 | 56.1 | −2.3186 |
| S14 | Aspheric | 1.4858 | 0.2661 | | | −5.3255 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens may be defined by using, but not limited to, the following aspheric formula:

$$x = \frac{ch^2}{1 + \sqrt{1 - (k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | 3.2870E−03 | 1.2180E−03 | −3.1000E−04 | −3.6700E−03 | 5.1060E−03 | −3.1600E−03 | 1.0410E−03 | −1.8000E−04 | 1.2800E−05 |
| S2 | −1.4050E−02 | 6.4492E−02 | −1.2551E−01 | 1.4071E−01 | −1.0186E−01 | 4.7740E−02 | −1.3860E−02 | 2.2580E−03 | −1.6000E−04 |
| S3 | 3.0249E−02 | −9.4300E−03 | −3.9730E−02 | 6.3453E−02 | −5.2900E−02 | 2.7194E−02 | −8.4400E−03 | 1.4400E−03 | −1.0000E−04 |
| S4 | −1.4130E−02 | 3.3435E−02 | −3.3010E−02 | 2.0944E−02 | −9.6400E−03 | 3.4010E−03 | −6.8000E−04 | 2.7800E−06 | 1.2800E−05 |
| S5 | −2.9280E−02 | 6.6642E−02 | −1.5202E−01 | 2.3274E−01 | −2.2029E−01 | 1.2937E−01 | −4.5810E−02 | 8.9640E−03 | −7.4000E−04 |
| S6 | −1.2900E−03 | −1.0380E−02 | 5.3200E−04 | 1.3567E−02 | −2.6330E−02 | 2.6894E−02 | −1.5300E−02 | 4.5600E−03 | −5.5000E−04 |
| S7 | −6.7640E−02 | 1.0091E−01 | −3.5416E−01 | 6.4567E−01 | −7.1563E−01 | 4.9480E−01 | −2.0743E−01 | 4.8184E−02 | −4.7600E−03 |
| S8 | 3.1940E−03 | −7.4970E−02 | 5.3884E−02 | −6.8460E−02 | 8.1466E−02 | −5.3660E−02 | 1.9407E−02 | −3.6900E−03 | 2.9200E−04 |
| S9 | 8.9705E−02 | −1.9364E−01 | 2.9358E−01 | −3.3167E−01 | 2.4066E−01 | −1.0804E−01 | 2.8863E−02 | −4.2200E−03 | 2.6200E−04 |
| S10 | 3.4522E−02 | −2.2714E−01 | 4.0333E−01 | −4.0280E−01 | 2.4434E−01 | −9.2020E−02 | 2.0917E−02 | −2.6100E−03 | 1.3700E−04 |
| S11 | 1.0690E−03 | −1.4634E−01 | 1.9464E−01 | −1.6359E−01 | 8.7686E−02 | −2.9970E−02 | 6.2700E−03 | −7.2000E−04 | 3.5000E−05 |

TABLE 2-continued

| Surface number | A4 | A6 | A8 | A10 | A12 | A14 | A16 | A18 | A20 |
|---|---|---|---|---|---|---|---|---|---|
| S12 | 6.3558E−02 | −5.7350E−02 | 1.9028E−02 | −3.4800E−03 | 7.8700E−05 | 1.3600E−04 | −3.4000E−05 | 3.5100E−06 | −1.4000E−07 |
| S13 | −2.9079E−01 | 1.9398E−01 | −1.1508E−01 | 5.0389E−02 | −1.4180E−02 | 2.4940E−03 | −2.7000E−04 | 1.5700E−05 | −4.0000E−07 |
| S14 | −1.3449E−01 | 7.8790E−02 | −3.8690E−02 | 1.2986E−02 | −2.7600E−03 | 3.6900E−04 | −3.0000E−05 | 1.3600E−06 | −2.6000E−08 |

Table 3 shows effective focal lengths f1 to f7 of respective lens, a total effective focal length f of the optical imaging lens assembly, a total track length TTL (i.e., a distance along the optical axis from the object-side surface S1 of the first lens E1 to the imaging plane S17), and half of a diagonal length ImgH of an effective pixel area on the imaging plane S17 in example 1.

TABLE 3

| f1 (mm) | 6.85 | f6 (mm) | 9.65 |
|---|---|---|---|
| f2 (mm) | −9.74 | f7 (mm) | −10.07 |
| f3 (mm) | 7.43 | f (mm) | 4.80 |
| f4 (mm) | 32.31 | TTL (mm) | 6.19 |
| f5 (mm) | −14.84 | ImgH (mm) | 3.60 |

FIG. 2A illustrates an astigmatic curve of the optical imaging lens assembly according to example 1, representing a curvature of a tangential plane and a curvature of a sagittal plane. FIG. 2B illustrates a distortion curve of the optical imaging lens assembly according to example 1, representing amounts of distortion corresponding to different image heights. FIG. 2C illustrates a lateral color curve of the optical imaging lens assembly according to example 1, representing deviations of different image heights on an imaging plane after light passes through the lens assembly. It can be seen from FIG. 2A to FIG. 2C that the optical imaging lens assembly provided in example 1 may achieve good image quality.

EXAMPLE 2

Figure 3:
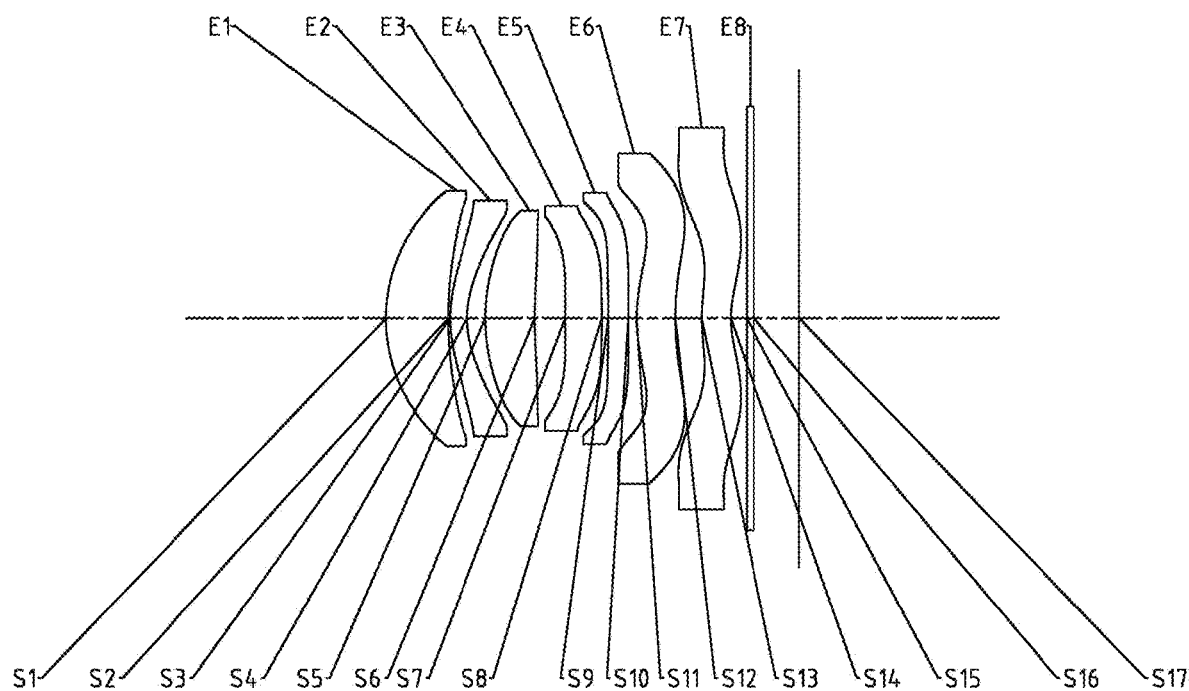
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the optical imaging lens assembly in example 2, wherein the units for the radius of curvature and the thickness are millimeter (mm).

TABLE 4

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.9115 | | | |
| S1 | Aspheric | 2.4770 | 0.9348 | 1.55 | 56.1 | −0.1970 |
| S2 | Aspheric | 6.1845 | 0.0300 | | | 0.9968 |
| S3 | Aspheric | 2.0786 | 0.2600 | 1.68 | 19.2 | −10.5102 |
| S4 | Aspheric | 1.5071 | 0.2750 | | | −3.4707 |
| S5 | Aspheric | 2.8304 | 0.7421 | 1.55 | 56.1 | −0.4344 |
| S6 | Aspheric | 8.4666 | 0.4582 | | | −99.0000 |
| S7 | Aspheric | 52.3091 | 0.5478 | 1.55 | 56.1 | −32.3588 |
| S8 | Aspheric | −23.0416 | 0.0976 | | | 99.0000 |
| S9 | Aspheric | −14.4815 | 0.3000 | 1.68 | 19.2 | −84.1272 |
| S10 | Aspheric | 47.0569 | 0.1250 | | | −99.0000 |
| S11 | Aspheric | 2.6990 | 0.5815 | 1.62 | 25.9 | −1.1061 |
| S12 | Aspheric | 4.8596 | 0.3950 | | | −74.2038 |
| S13 | Aspheric | 2.6004 | 0.4374 | 1.62 | 25.9 | −2.0254 |
| S14 | Aspheric | 1.5781 | 0.2387 | | | −7.0457 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 4, the object-side surface and the image-side surface of any one of the first lens E1 to the seventh lens E7 are aspheric in example 2. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 | A18 | A20 |
|---|---|---|---|---|---|---|---|---|---|
| S1 | 4.0020E−03 | −3.3000E−04 | 9.1100E−04 | −3.5500E−03 | 4.0800E−03 | −2.3100E−03 | 7.1300E−04 | −1.1000E−04 | 7.6700E−06 |
| S2 | −1.3170E−02 | 6.1674E−02 | −1.1847E−01 | 1.3046E−01 | −9.2380E−02 | 4.2246E−02 | −1.1960E−02 | 1.9020E−03 | −1.3000E−04 |
| S3 | 3.0335E−02 | −9.5400E−03 | −3.5150E−02 | 5.3251E−02 | −4.1840E−02 | 2.0295E−02 | −5.9500E−03 | 9.5700E−04 | −6.5000E−05 |
| S4 | −1.2630E−02 | 3.0148E−02 | −2.5900E−02 | 1.0507E−02 | −1.0900E−03 | −5.5000E−04 | 3.2100E−04 | −1.1000E−04 | 1.6200E−05 |
| S5 | −2.9140E−02 | 6.6434E−02 | −1.5162E−01 | 2.3063E−01 | −2.1640E−01 | 1.2572E−01 | −4.3910E−02 | 8.4490E−03 | −6.9000E−04 |
| S6 | −1.4100E−03 | −1.4260E−02 | 9.2930E−03 | −3.1000E−04 | −1.1450E−02 | 1.6092E−02 | −1.0180E−02 | 3.1690E−03 | −3.9000E−04 |
| S7 | −6.5000E−02 | 6.7731E−02 | −2.2954E−01 | 3.9979E−01 | −4.2800E−01 | 2.8836E−01 | −1.1807E−01 | 2.6793E−02 | −2.5900E−03 |
| S8 | 1.3402E−02 | −1.7953E−01 | 3.8878E−01 | −5.8061E−01 | 5.2900E−01 | −2.9110E−01 | 9.5458E−02 | −1.7260E−02 | 1.3310E−03 |
| S9 | 9.1091E−02 | −2.7243E−01 | 5.4723E−01 | −6.9247E−01 | 5.2971E−01 | −2.4828E−01 | 6.9870E−02 | −1.0880E−02 | 7.2300E−04 |
| S10 | 2.7520E−02 | −2.5582E−01 | 4.9421E−01 | −5.1756E−01 | 3.2461E−01 | −1.2582E−01 | 2.9425E−02 | −3.7900E−03 | 2.0500E−04 |
| S11 | 5.1100E−04 | −1.4425E−01 | 1.9684E−01 | −1.7307E−01 | 9.6413E−02 | −3.3880E−02 | 7.2200E−03 | −8.4000E−04 | 4.1200E−05 |
| S12 | 7.4946E−02 | −5.6950E−02 | 1.0788E−02 | 3.6260E−03 | −2.9100E−03 | 8.5600E−04 | −1.3000E−04 | 1.1100E−05 | −3.8000E−07 |
| S13 | −2.8129E−01 | 1.8483E−01 | −1.0127E−01 | 4.0323E−02 | −1.0400E−02 | 1.6920E−03 | −1.7000E−04 | 9.3200E−06 | −2.2000E−07 |
| S14 | −1.2201E−01 | 6.4464E−02 | −2.8010E−02 | 8.2570E−03 | −1.5400E−03 | 1.8400E−04 | −1.4000E−05 | 5.7800E−07 | −1.1000E−08 |

Table 6 shows effective focal lengths f1 to f7 of respective lens, a total effective focal length f of the optical imaging lens assembly, a total track length TTL, and half of a diagonal length ImgH of an effective pixel area on the imaging plane S17 in example 2.

TABLE 6

| f1 (mm) | 6.95 | f6 (mm) | 8.89 |
|---|---|---|---|
| f2 (mm) | −9.91 | f7 (mm) | −7.75 |
| f3 (mm) | 7.44 | f (mm) | 4.80 |
| f4 (mm) | 29.37 | TTL (mm) | 6.22 |
| f5 (mm) | −16.31 | ImgH (mm) | 3.60 |

Figures 4A, 4B:
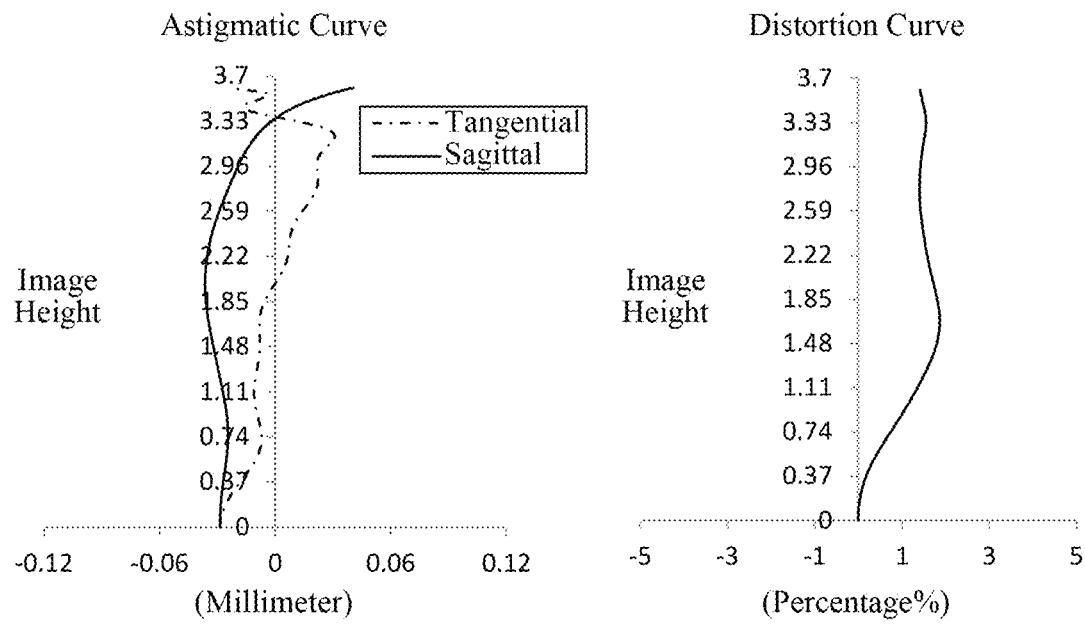
FIGS. 4A to 4C illustrate an astigmatic curve, a distortion curve, and a lateral color curve of the optical imaging lens group of the Example 2, respectively.
Figure 4C:
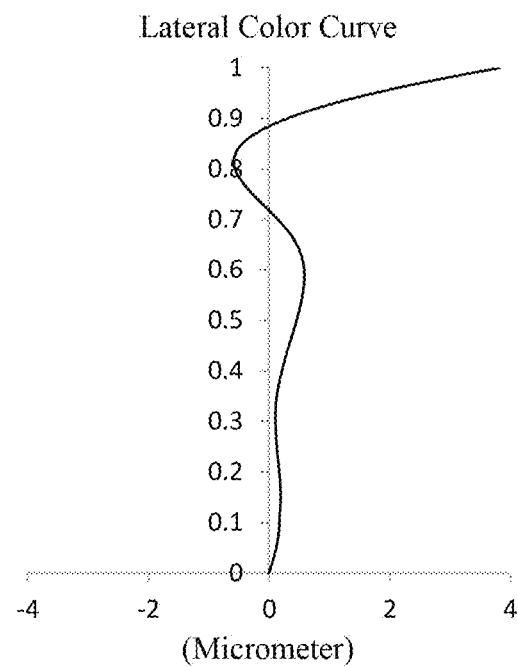

FIG. 4A illustrates an astigmatic curve of the optical imaging lens assembly according to example 2, representing a curvature of a tangential plane and a curvature of a sagittal plane. FIG. 4B illustrates a distortion curve of the optical imaging lens assembly according to example 2, representing amounts of distortion corresponding to different image heights. FIG. 4C illustrates a lateral color curve of the optical imaging lens assembly according to example 2, representing deviations of different image heights on an imaging plane after light passes through the lens assembly. It can be seen from FIG. 4A to FIG. 4C that the optical imaging lens assembly provided in example 2 may achieve good image quality.

EXAMPLE 3

An optical imaging lens assembly according to example 3 of the present disclosure is described below with reference to FIG. 5 to FIG. 6C. FIG. 5 shows a schematic structural view of the optical imaging lens assembly according to example 3 of the present disclosure.

As shown in FIG. 5, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the optical imaging lens assembly in example 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.9658 | | | |
| S1 | Aspheric | 2.4837 | 0.9777 | 1.55 | 56.1 | −0.2026 |
| S2 | Aspheric | 6.3344 | 0.0337 | | | 1.2477 |
| S3 | Aspheric | 2.0050 | 0.2618 | 1.68 | 19.2 | −10.1054 |
| S4 | Aspheric | 1.4510 | 0.2621 | | | −3.4302 |
| S5 | Aspheric | 2.7645 | 0.7754 | 1.54 | 55.7 | −0.6291 |
| S6 | Aspheric | 8.1682 | 0.4673 | | | −82.0803 |
| S7 | Aspheric | 42.7661 | 0.4569 | 1.54 | 55.7 | 86.5462 |
| S8 | Aspheric | −23.9981 | 0.0774 | | | 99.0000 |
| S9 | Aspheric | −15.6164 | 0.3000 | 1.68 | 19.2 | −97.1125 |
| S10 | Aspheric | 26.0572 | 0.0883 | | | −85.9154 |
| S11 | Aspheric | 2.5494 | 0.5744 | 1.62 | 25.9 | −1.1012 |
| S12 | Aspheric | 4.0489 | 0.3571 | | | −84.1745 |
| S13 | Aspheric | 2.1799 | 0.4640 | 1.54 | 55.7 | −2.0854 |
| S14 | Aspheric | 1.5196 | 0.2533 | | | −5.7024 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 7, the object-side surface and the image-side surface of any one of the first lens E1 to the seventh lens E7 are aspheric in example 3. Table 8 shows high-order coefficients applicable to each aspheric surface in example 3, wherein the surface shape of each aspheric surface may be defined by the formula (1) given in the above example 1.

thereof is a convex surface, and an image-side surface S4 thereof is a concave surface. The third lens E3 has positive refractive power, an object-side surface S5 thereof is a

TABLE 8

| Surface number | A4 | A6 | A8 | A10 | A12 | A14 | A16 | A18 | A20 |
|---|---|---|---|---|---|---|---|---|---|
| S1 | 3.4780E−03 | 6.3800E−04 | 1.7600E−04 | −3.3000E−03 | 4.1070E−03 | −2.3700E−03 | 7.3700E−04 | −1.2000E−04 | 7.9700E−06 |
| S2 | −1.4230E−02 | 6.2619E−02 | −1.1766E−01 | 1.2861E−01 | −9.0780E−02 | 4.1384E−02 | −1.1660E−02 | 1.8400E−03 | −1.2000E−04 |
| S3 | 3.0732E−02 | −1.0040E−02 | −3.4910E−02 | 5.3395E−02 | −4.2120E−02 | 2.0489E−02 | −6.0300E−03 | 9.7900E−04 | −6.7000E−05 |
| S4 | −1.1990E−02 | 2.8524E−02 | −2.3280E−02 | 7.2770E−03 | 1.5710E−03 | −1.9600E−03 | 7.7500E−04 | −1.9000E−04 | 2.1100E−05 |
| S5 | −3.0510E−02 | 6.3930E−02 | −1.4012E−01 | 2.0743E−01 | −1.9005E−01 | 1.0775E−01 | −3.6650E−02 | 6.8520E−03 | −5.4000E−04 |
| S6 | −1.2000E−04 | −1.4220E−02 | 8.9020E−03 | −8.2000E−04 | −9.2800E−03 | 1.3365E−02 | −8.5000E−03 | 2.6380E−03 | −3.2000E−04 |
| S7 | −6.4130E−02 | 7.0210E−02 | −2.4396E−01 | 4.2943E−01 | −4.6105E−01 | 3.0995E−01 | −1.2611E−01 | 2.8328E−02 | −2.7000E−03 |
| S8 | 2.0408E−02 | −2.3956E−01 | 5.1131E−01 | −7.0330E−01 | 5.9674E−01 | −3.1103E−01 | 9.7703E−02 | −1.7050E−02 | 1.2740E−03 |
| S9 | 1.0925E−01 | −3.4817E−01 | 6.7668E−01 | −8.0516E−01 | 5.8684E−01 | −2.6598E−01 | 7.3185E−02 | −1.1220E−02 | 7.3800E−04 |
| S10 | 5.2111E−02 | −3.2373E−01 | 5.6640E−01 | −5.5239E−01 | 3.2801E−01 | −1.2185E−01 | 2.7591E−02 | −3.4600E−03 | 1.8400E−04 |
| S11 | 4.7910E−03 | −1.5425E−01 | 2.0738E−01 | −1.8204E−01 | 1.0154E−01 | −3.5880E−02 | 7.7380E−03 | −9.2000E−04 | 4.5800E−05 |
| S12 | 8.1813E−02 | −5.3030E−02 | 2.6730E−03 | 8.5460E−03 | −4.6000E−03 | 1.2210E−03 | −1.8000E−04 | 1.4900E−05 | −5.0000E−07 |
| S13 | −3.1682E−01 | 2.2491E−01 | −1.2711E−01 | 5.1282E−02 | −1.3440E−02 | 2.2320E−03 | −2.3000E−04 | 1.3000E−05 | −3.2000E−07 |
| S14 | −1.3600E−01 | 7.6830E−02 | −3.4470E−02 | 1.0176E−02 | −1.8600E−03 | 2.1300E−04 | −1.5000E−05 | 6.0400E−07 | −1.1000E−08 |

Table 9 shows effective focal lengths f1 to f7 of respective lens, a total effective focal length f of the optical imaging lens assembly, a total track length TTL, and half of a diagonal length ImgH of an effective pixel area on the imaging plane S17 in example 3.

TABLE 9

| f1 (mm) | 6.87 | f6 (mm) | 9.70 |
|---|---|---|---|
| f2 (mm) | −9.58 | f7 (mm) | −12.39 |
| f3 (mm) | 7.41 | f (mm) | 4.69 |
| f4 (mm) | 28.71 | TTL (mm) | 6.14 |
| f5 (mm) | −14.37 | ImgH (mm) | 3.41 |

Figure 6C:
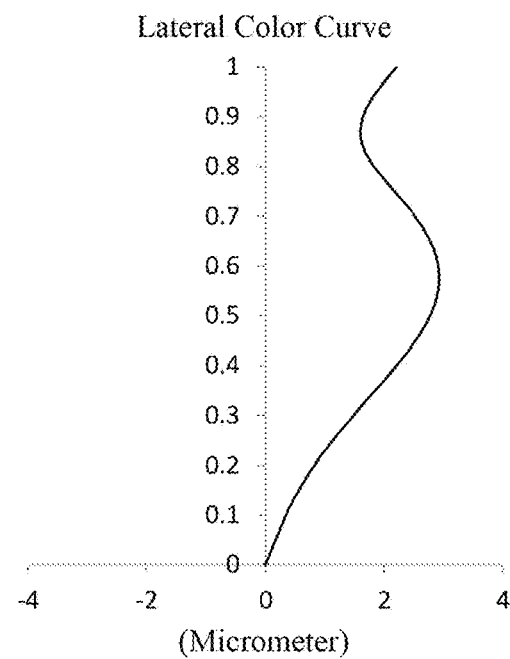

FIG. 6A illustrates an astigmatic curve of the optical imaging lens assembly according to example 3, representing a curvature of a tangential plane and a curvature of a sagittal plane. FIG. 6B illustrates a distortion curve of the optical imaging lens assembly according to example 3, representing amounts of distortion corresponding to different image heights. FIG. 6C illustrates a lateral color curve of the optical imaging lens assembly according to example 3, representing deviations of different image heights on an imaging plane after light passes through the lens assembly. It can be seen from FIG. 6A to FIG. 6C that the optical imaging lens assembly provided in example 3 may achieve good image quality.

EXAMPLE 4

Figure 7:
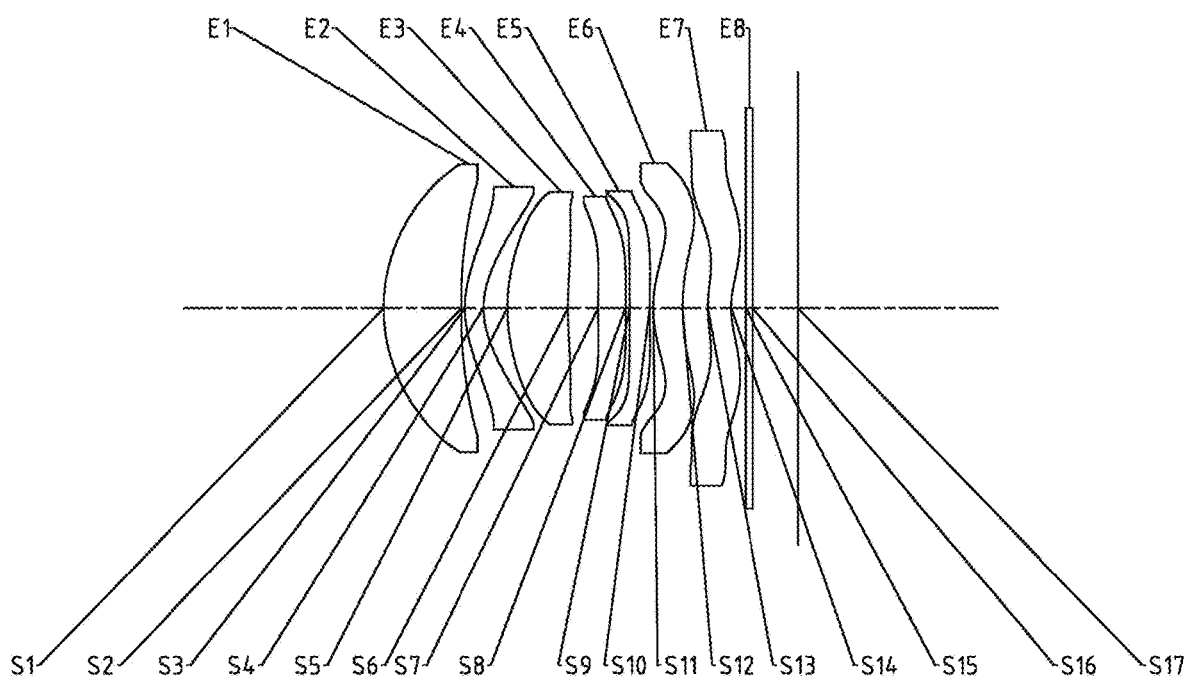
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8C. FIG. 7 shows a schematic structural view of the optical imaging lens assembly according to example 4 of the present disclosure.

As shown in FIG. 7, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the optical imaging lens assembly in example 4, wherein the units for the radius of curvature and the thickness are millimeter (mm).

TABLE 10

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −1.1541 | | | |
| S1 | Aspheric | 2.6800 | 1.1715 | 1.55 | 56.1 | −0.1358 |
| S2 | Aspheric | 9.1298 | 0.0575 | | | 6.4764 |
| S3 | Aspheric | 1.7352 | 0.2799 | 1.68 | 19.2 | −6.6746 |
| S4 | Aspheric | 1.2705 | 0.3590 | | | −2.7352 |
| S5 | Aspheric | 2.9073 | 0.9102 | 1.54 | 55.7 | −0.3847 |
| S6 | Aspheric | 8.2516 | 0.4514 | | | −88.9328 |
| S7 | Aspheric | 15.7182 | 0.4133 | 1.54 | 55.7 | 82.9533 |
| S8 | Aspheric | −90.1497 | 0.0624 | | | −99.0000 |
| S9 | Aspheric | −11.4690 | 0.0300 | 1.68 | 19.2 | −94.4809 |
| S10 | Aspheric | 20.5969 | 0.0516 | | | 58.9868 |
| S11 | Aspheric | 1.9913 | 0.4401 | 1.62 | 25.9 | −1.4185 |
| S12 | Aspheric | 3.2703 | 0.3799 | | | −51.5488 |
| S13 | Aspheric | 2.0193 | 0.3500 | 1.54 | 55.7 | −1.9530 |
| S14 | Aspheric | 1.4319 | 0.2208 | | | −6.3628 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 10, the object-side surface and the image-side surface of any one of the first lens E1 to the seventh lens E7 are aspheric in example 4. Table 11 shows high-order coefficients applicable to each aspheric surface in example 4, wherein the surface shape of each aspheric surface may be defined by the formula (1) given in the above example 1.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a

TABLE 11

| Surface number | A4 | A6 | A8 | A10 | A12 | A14 | A16 | A18 | A20 |
|---|---|---|---|---|---|---|---|---|---|
| S1  | 2.8580E−03 | 3.2800E−04 | 2.8000E−04 | −1.7700E−03 | 1.6840E−03 | −7.6000E−04 | 1.8300E−04 | −2.3000E−05 | 1.2000E−06 |
| S2  | −7.3700E−03 | 4.4865E−02 | −7.3930E−02 | 6.9862E−02 | −4.2280E−02 | 1.6453E−02 | −3.9600E−03 | 5.3400E−04 | −3.1000E−05 |
| S3  | 3.0056E−02 | −1.1430E−02 | −2.1820E−02 | 3.0684E−02 | −2.1580E−02 | 9.2170E−03 | −2.3500E−03 | 3.2600E−04 | −1.9000E−05 |
| S4  | −6.0500E−03 | 1.8636E−02 | −1.5130E−02 | 4.4890E−03 | −8.8000E−05 | −1.3000E−04 | 7.7600E−06 | −9.2000E−06 | 2.4500E−06 |
| S5  | −2.3310E−02 | 4.8343E−02 | −8.6280E−02 | 1.0226E−01 | −7.5090E−02 | 3.4117E−02 | −9.3000E−03 | 1.3960E−03 | −8.9000E−05 |
| S6  | −1.0700E−03 | −1.7400E−02 | 1.5443E−02 | −9.1800E−03 | 1.5453E−03 | 6.7440E−03 | −4.4000E−03 | 1.2590E−03 | −1.4000E−04 |
| S7  | −6.2930E−02 | 2.6995E−02 | −7.7850E−02 | 1.2183E−01 | −1.2324E−01 | 8.0407E−02 | −3.1640E−02 | 6.7930E−03 | −6.1000E−04 |
| S8  | 1.3198E−01 | −8.5054E−01 | 1.9271E+00 | −2.4852E+00 | 1.9503E+00 | −9.5221E−01 | 2.8366E−01 | −4.7350E−02 | 3.4020E−03 |
| S9  | 2.5964E−01 | −1.0295E+00 | 2.1312E+00 | −2.5487E+00 | 1.8574E+00 | −8.4334E−01 | 2.3325E−01 | −3.6000E−02 | 2.3800E−03 |
| S10 | 8.1882E−02 | −5.6550E−01 | 1.1022E+00 | −1.1848E+00 | 7.7067E−01 | −3.1153E−01 | 7.6402E−02 | −1.0370E−02 | 5.9600E−04 |
| S11 | −4.0020E−02 | −1.2707E−01 | 2.5825E−01 | −3.0377E−01 | 2.0324E−01 | −8.0640E−02 | 1.8856E−02 | −2.3900E−03 | 1.2600E−04 |
| S12 | 8.1718E−02 | −1.9000E−03 | −9.1960E−02 | 8.2239E−02 | −3.7400E−02 | 1.0217E−02 | −1.6900E−03 | 1.5500E−04 | −6.1000E−06 |
| S13 | −4.1305E−01 | 3.1900E−01 | −1.9159E−01 | 8.5123E−02 | −2.5160E−02 | 4.7450E−03 | −5.5000E−04 | 3.5400E−05 | −9.8000E−07 |
| S14 | −1.7948E−01 | 1.1094E−01 | −5.3720E−02 | 1.7266E−02 | −3.3600E−03 | 3.9300E−04 | −2.7000E−05 | 1.0100E−06 | −1.6000E−08 |

Table 12 shows effective focal lengths f1 to f7 of respective lens, a total effective focal length f of the optical imaging lens assembly, a total track length TTL, and half of a diagonal length ImgH of an effective pixel area on the imaging plane S17 in example 4.

TABLE 12

| f1 (mm) | 6.53 | f6 (mm) | 7.27 |
|---|---|---|---|
| f2 (mm) | −9.25 | f7 (mm) | −11.58 |
| f3 (mm) | 7.89 | f (mm) | 4.70 |
| f4 (mm) | 24.97 | TTL (mm) | 6.24 |
| f5 (mm) | −10.83 | ImgH (mm) | 3.14 |

FIG. 8A illustrates an astigmatic curve of the optical imaging lens assembly according to example 4, representing a curvature of a tangential plane and a curvature of a sagittal plane. FIG. 8B illustrates a distortion curve of the optical imaging lens assembly according to example 4, representing amounts of distortion corresponding to different image heights. FIG. 8C illustrates a lateral color curve of the optical imaging lens assembly according to example 4, representing deviations of different image heights on an imaging plane after light passes through the lens assembly. It can be seen from FIG. 8A to FIG. 8C that the optical imaging lens assembly provided in example 4 may achieve good image quality.

EXAMPLE 5

Figure 9:
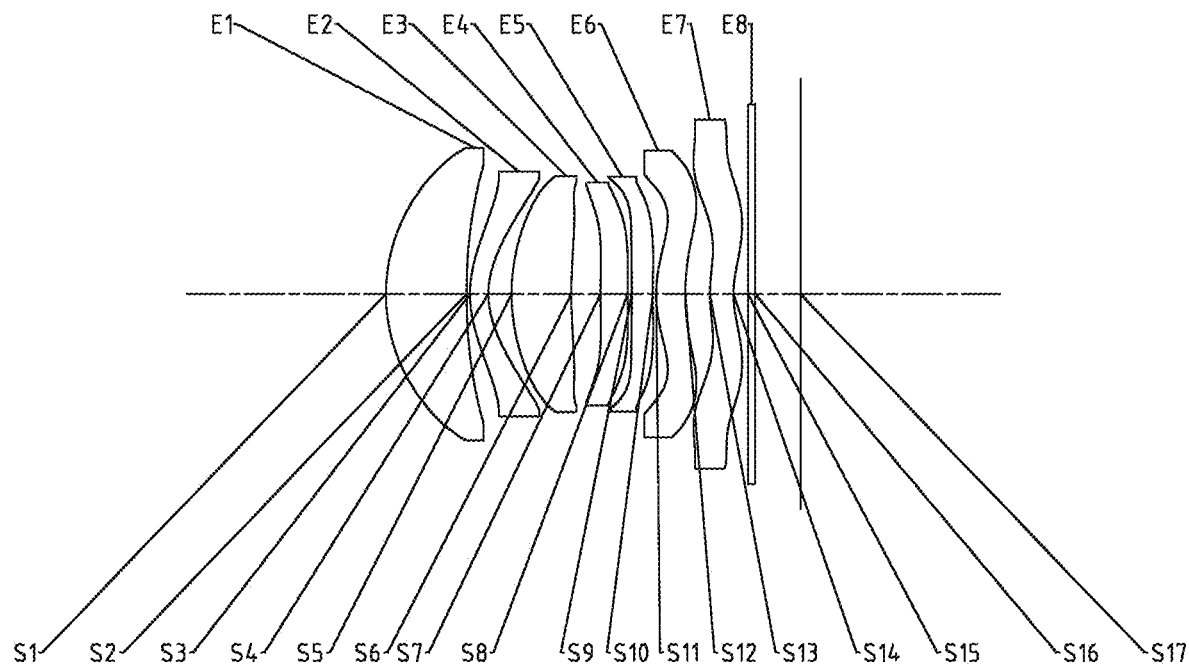
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10C. FIG. 9 shows a schematic structural view of the optical imaging lens assembly according to example 5 of the present disclosure.

As shown in FIG. 9, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the optical imaging lens assembly in example 5, wherein the units for the radius of curvature and the thickness are millimeter (mm).

TABLE 13

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −1.2046 | | | |
| S1  | Aspheric | 2.6699 | 1.2132 | 1.55 | 56.1 | −0.1425 |
| S2  | Aspheric | 9.0016 | 0.0515 | | | 6.4682 |
| S3  | Aspheric | 1.7395 | 0.2767 | 1.68 | 19.2 | −6.5530 |
| S4  | Aspheric | 1.2740 | 0.3490 | | | −2.6671 |
| S5  | Aspheric | 2.8863 | 0.9002 | 1.54 | 55.7 | −0.3477 |
| S6  | Aspheric | 8.0312 | 0.4387 | | | −75.0435 |
| S7  | Aspheric | 15.4871 | 0.4098 | 1.54 | 55.7 | 84.8101 |
| S8  | Aspheric | −110.4910 | 0.0617 | | | 99.0000 |
| S9  | Aspheric | −11.9745 | 0.3164 | 1.68 | 19.2 | −87.9544 |
| S10 | Aspheric | 21.1897 | 0.0499 | | | 52.5671 |
| S11 | Aspheric | 2.0210 | 0.4385 | 1.62 | 25.9 | −1.6694 |
| S12 | Aspheric | 3.3516 | 0.3696 | | | −59.2092 |
| S13 | Aspheric | 2.0718 | 0.3545 | 1.54 | 55.7 | −2.1161 |

TABLE 13-continued

| Surface number | Surface type | Radius of curvature | Thickness | Material Refractive index | Abbe number | Conic coefficient |
|---|---|---|---|---|---|---|
| S14 | Aspheric | 1.4583 | 0.2178 | | | −6.7153 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 13, the object-side surface and the image-side surface of any one of the first lens E1 to the seventh lens E7 are aspheric in example 5. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 | A14 | A16 | A18 | A20 |
|---|---|---|---|---|---|---|---|---|---|
| S1 | 2.4020E−03 | 5.7400E−04 | 2.3400E−04 | −1.7800E−03 | 1.7050E−03 | −7.7000E−04 | 1.8600E−04 | −2.4000E−05 | 1.2200E−06 |
| S2 | −7.2700E−03 | 4.3759E−02 | −7.1520E−02 | 6.7045E−02 | −4.0250E−02 | 1.5538E−02 | −3.7100E−03 | 4.9700E−04 | −2.9000E−05 |
| S3 | 2.9976E−02 | −1.1450E−02 | −2.1380E−02 | 2.9911E−02 | −2.0910E−02 | 8.8700E−03 | −2.2500E−03 | 3.0800E−04 | −1.8000E−05 |
| S4 | −5.8700E−03 | 1.8957E−02 | −1.5510E−02 | 4.7290E−03 | −2.2000E−04 | −4.9000E−05 | −2.7000E−05 | −2.3000E−06 | 1.9500E−06 |
| S5 | −2.1790E−02 | 4.7152E−02 | −8.3660E−02 | 9.7908E−02 | −7.1100E−02 | 3.1902E−02 | −8.5600E−03 | 1.2620E−03 | −7.8000E−05 |
| S6 | −6.2000E−04 | −1.6900E−02 | 1.4651E−02 | −9.0000E−03 | −1.3600E−03 | 6.4540E−03 | −4.2200E−03 | 1.2030E−03 | −1.3000E−04 |
| S7 | −6.1900E−02 | 2.6457E−02 | −7.4760E−02 | 1.1545E−01 | −1.1526E−01 | 7.4286E−02 | −2.8840E−02 | 6.1070E−03 | −5.4000E−04 |
| S8 | 1.6680E−01 | −1.0086E+00 | 2.2437E+00 | −2.8388E+00 | 2.1913E+00 | −1.0550E+00 | 3.1049E−01 | −5.1260E−02 | 3.6460E−03 |
| S9 | 2.7918E−01 | −1.1303E+00 | 2.3318E+00 | −2.7623E+00 | 1.9951E+00 | −8.9889E−01 | 2.4694E−01 | −3.7880E−02 | 2.4880E−03 |
| S10 | 7.2785E−02 | −5.5264E−01 | 1.0822E+00 | −1.1580E+00 | 7.5040E−01 | −3.0300E−01 | 7.4423E−02 | −1.0140E−02 | 5.8600E−04 |
| S11 | −4.0410E−02 | −1.1430E−01 | 2.2685E−01 | −2.6870E−01 | 1.8093E−01 | −7.1880E−02 | 1.6741E−02 | −2.1000E−03 | 1.1000E−04 |
| S12 | 8.5203E−02 | −1.08005E−03 | −1.0226E−01 | 9.4181E−02 | −4.4020E−02 | 1.22895E−02 | −2.0600E−03 | 1.91005E−04 | −7.5000E−06 |
| S13 | −4.0922E−01 | 3.2101E−01 | −1.8745E−01 | 7.8315E−02 | −2.1560E−02 | 3.78305E−03 | −4.1000E−04 | 2.46005E−05 | −6.4000E−07 |
| S14 | −1.7485E−01 | 1.0759E−01 | −5.0880E−02 | 1.5742E−02 | −2.9400E−03 | 3.2900E−04 | −2.2000E−05 | 7.7300E−07 | −1.2000E−08 |

Table 15 shows effective focal lengths f1 to f7 of respective lens, a total effective focal length f of the optical imaging lens assembly, a total track length TTL, and half of a diagonal length ImgH of an effective pixel area on the imaging plane S17 in example 5.

TABLE 15

| f1 (mm) | 6.51 | f6 (mm) | 7.30 |
|---|---|---|---|
| f2 (mm) | −9.24 | f7 (mm) | −11.50 |
| f3 (mm) | 7.91 | f (mm) | 4.69 |
| f4 (mm) | 25.33 | TTL (mm) | 6.24 |
| f5 (mm) | −11.25 | ImgH (mm) | 3.24 |

Figures 10A, 10B:
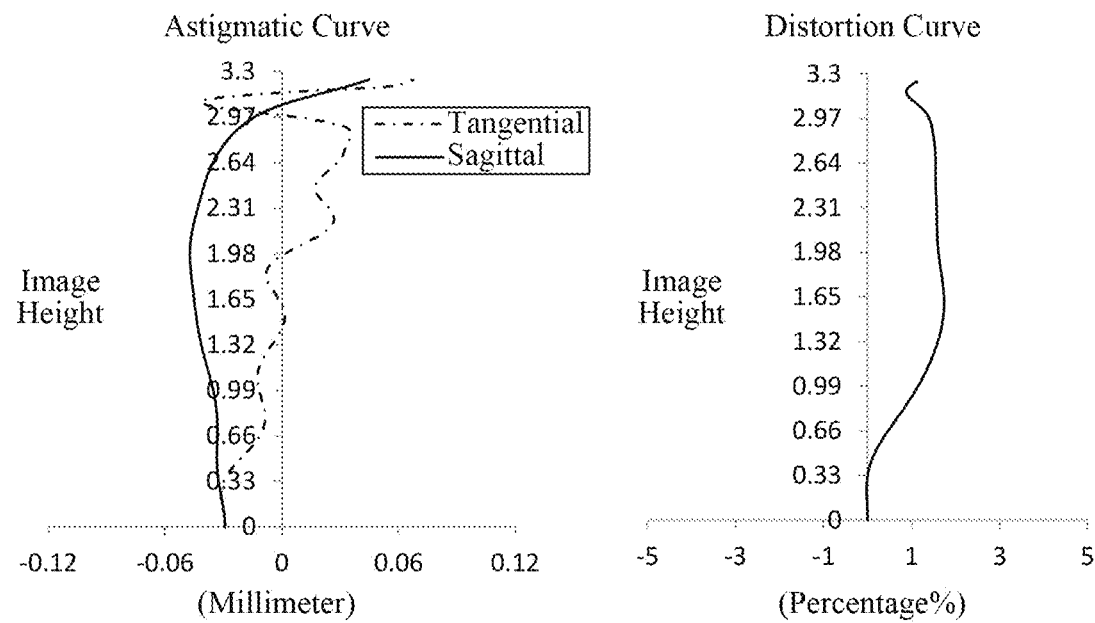
FIGS. 10A to 10C illustrate an astigmatic curve, a distortion curve, and a lateral color curve of the optical imaging lens group of the Example 5, respectively.
Figure 10C:
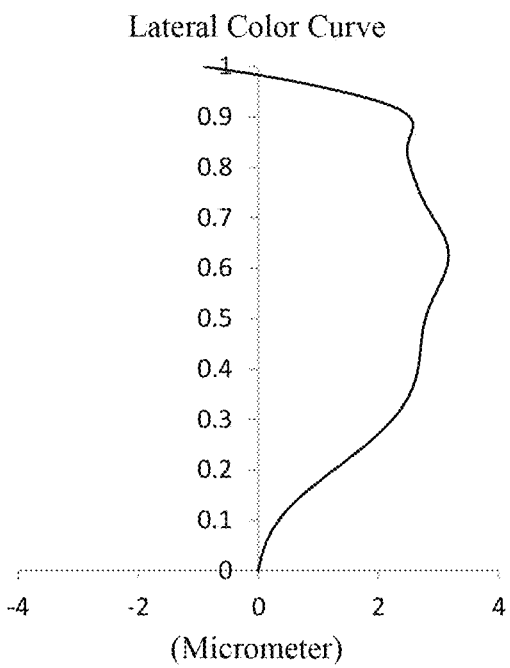

FIG. 10A illustrates an astigmatic curve of the optical imaging lens assembly according to example 5, representing a curvature of a tangential plane and a curvature of a sagittal plane. FIG. 10B illustrates a distortion curve of the optical imaging lens assembly according to example 5, representing amounts of distortion corresponding to different image heights. FIG. 10C illustrates a lateral color curve of the optical imaging lens assembly according to example 5, representing deviations of different image heights on an imaging plane after light passes through the lens assembly. It can be seen from FIG. 10A to FIG. 10C that the optical imaging lens assembly provided in example 5 may achieve good image quality.

EXAMPLE 6

Figure 11:
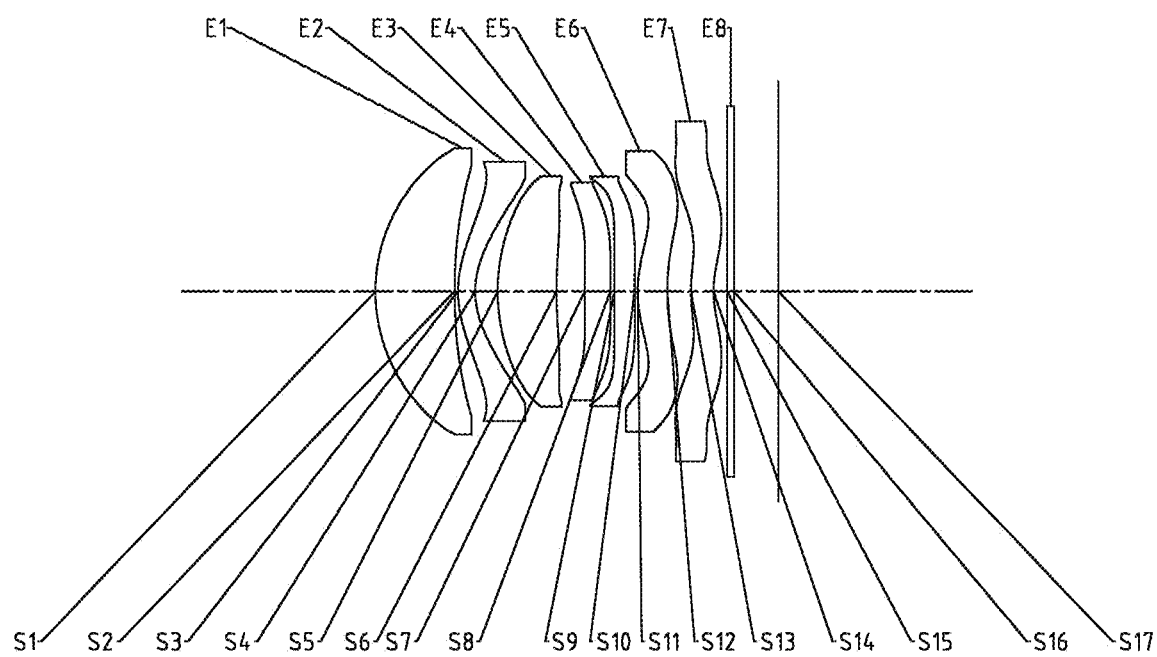
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12C. FIG. 11 shows a schematic structural view of the optical imaging lens assembly according to example 6 of the present disclosure.

As shown in FIG. 11, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the optical imaging lens assembly in example 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −1.2275 | | | |

TABLE 16-continued

| Surface number | Surface type | Radius of curvature | Thickness | Material Refractive index | Abbe number | Conic coefficient |
|---|---|---|---|---|---|---|
| S1 | Aspheric | 2.6454 | 1.2268 | 1.55 | 56.1 | −0.1408 |
| S2 | Aspheric | 8.6759 | 0.0532 | | | 6.4502 |
| S3 | Aspheric | 1.7007 | 0.2646 | 1.68 | 19.2 | −6.3893 |
| S4 | Aspheric | 1.2541 | 0.3490 | | | −2.6595 |
| S5 | Aspheric | 2.8788 | 0.9132 | 1.54 | 55.7 | −0.2740 |
| S6 | Aspheric | 7.9779 | 0.4337 | | | −73.8866 |
| S7 | Aspheric | 15.5099 | 0.3981 | 1.54 | 55.7 | 84.5907 |
| S8 | Aspheric | −681.1740 | 0.0640 | | | −99.0000 |
| S9 | Aspheric | −11.8748 | 0.3110 | 1.68 | 19.2 | −99.0000 |
| S10 | Aspheric | 25.7137 | 0.0499 | | | 99.0000 |
| S11 | Aspheric | 2.0524 | 0.4570 | 1.62 | 25.9 | −1.5376 |
| S12 | Aspheric | 3.4389 | 0.3660 | | | −50.6034 |
| S13 | Aspheric | 2.1766 | 0.3500 | 1.54 | 55.7 | −2.0144 |
| S14 | Aspheric | 1.5095 | 0.2111 | | | −7.0995 |
| S15 | Spherical | Infinite | 0.1100 | 1.52 | 64.2 | |
| S16 | Spherical | Infinite | 0.6824 | | | |
| S17 | Spherical | Infinite | | | | |

As can be seen from Table 16, the object-side surface and the image-side surface of any one of the first lens E1 to the seventh lens E7 are aspheric in example 6. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 | A18 | A20 |
|---|---|---|---|---|---|---|---|---|---|
| S1 | 2.3810E−03 | 6.0600E−04 | 2.2000E−04 | −1.7700E−03 | 1.6880E−03 | −7.6000E−04 | 1.8300E−04 | −2.3000E−05 | 1.1900E−06 |
| S2 | −7.2400E−03 | 4.5012E−02 | −7.4020E−02 | 6.9925E−02 | −4.2340E−02 | 1.6483E−02 | −3.9700E−03 | 5.3500E−04 | −3.1000E−05 |
| S3 | 3.0150E−02 | −1.1720E−02 | −2.1390E−02 | 2.9930E−02 | −2.0910E−02 | 8.8590E−03 | −2.2400E−03 | 3.0700E−04 | −1.7000E−05 |
| S4 | −5.8900E−03 | 1.9379E−02 | −1.5470E−02 | 4.3060E−03 | 2.3800E−03 | −3.3000E−04 | 8.1400E−05 | −2.6000E−05 | 4.0300E−06 |
| S5 | −2.0760E−02 | 4.6118E−02 | −8.2380E−02 | 9.6629E−02 | −7.0070E−02 | 3.1378E−02 | −8.4100E−03 | 1.2380E−03 | −7.7000E−05 |
| S6 | −3.9000E−04 | −1.5900E−02 | 1.3519E−02 | −8.6400E−03 | −1.2900E−03 | 6.3030E−03 | −4.1100E−03 | 1.1660E−03 | −1.3000E−04 |
| S7 | −6.1640E−02 | 2.6535E−02 | −7.3770E−02 | 1.1327E−01 | −1.1276E−01 | 7.2481E−02 | −2.8040E−02 | 5.9110E−03 | −5.2000E−04 |
| S8 | 1.6833E−01 | −9.8603E−01 | 2.1793E+00 | −2.7603E+00 | 2.1362E+00 | −1.0304E+00 | 3.0351E−01 | −5.01105−02 | 3.5620E−03 |
| S9 | 2.9375E−01 | −1.1482E+00 | 2.3489E+00 | −2.7862E+00 | 2.0203E+00 | −9.1421E−01 | 2.5240E−01 | −3.89705−02 | 2.5830E−03 |
| S10 | 8.9500E−02 | −5.9530E−01 | 1.1658E+00 | −1.2595E+00 | 8.2297E−01 | −3.3366E−01 | 8.1943E−02 | −1.1130E−02 | 6.3900E−04 |
| S11 | −3.8960E−02 | −1.4971E−01 | 3.0535E−01 | −3.5848E−01 | 2.4155E−01 | −9.6850E−02 | 2.2895E−02 | −2.93005−03 | 1.5700E−04 |
| S12 | 6.7725E−02 | 1.2486E−02 | −1.0501E−01 | 9.2093E−02 | −4.2270E−02 | 1.1690E−02 | −1.9500E−03 | 1.80005−04 | −7.1000E−06 |
| S13 | −3.9468E−01 | 3.0041E−01 | −1.7386E−01 | 7.3878E−02 | −2.0890E−02 | 3.7740E−03 | −4.2000E−04 | 2.59005−05 | −6.9000E−07 |
| S14 | −1.6990E−01 | 1.0174E−01 | −4.8030E−02 | 1.5029E−02 | −2.8300E−03 | 3.1800E−04 | −2.1000E−05 | 7.42005−07 | −1.1000E−08 |

Table 18 shows effective focal lengths f1 to f7 of respective lens, a total effective focal length f of the optical imaging lens assembly, a total track length TTL, and half of a diagonal length ImgH of an effective pixel area on the imaging plane S17 in example 6.

TABLE 18

| f1 (mm) | 6.50 | f6 (mm) | 7.30 |
| f2 (mm) | −9.27 | f7 (mm) | −11.23 |
| f3 (mm) | 7.90 | f (mm) | 4.69 |
| f4 (mm) | 28.26 | TTL (mm) | 6.24 |
| f5 (mm) | −11.95 | ImgH (mm) | 3.24 |

Figures 12A, 12B:
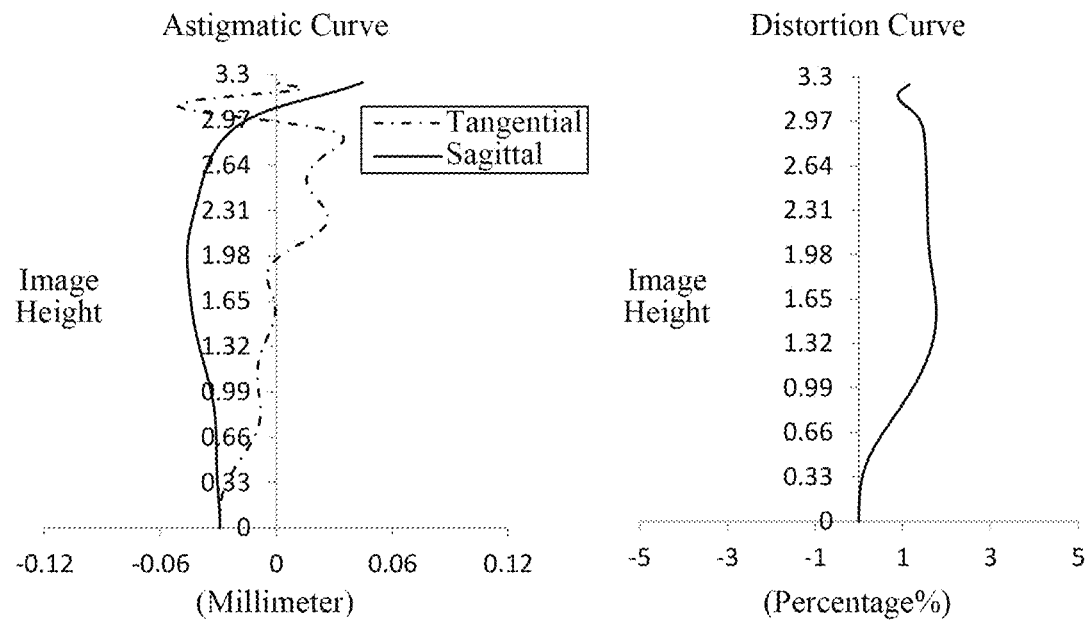
FIGS. 12A to 12C illustrate an astigmatic curve, a distortion curve, and a lateral color curve of the optical imaging lens group of the Example 6, respectively.
Figure 12C:
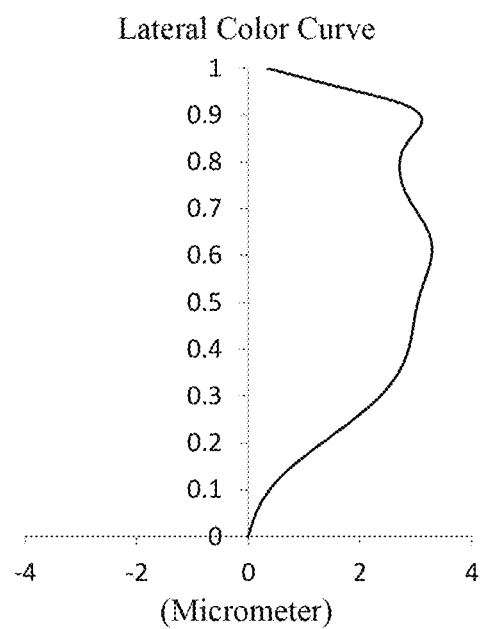

FIG. 12A illustrates an astigmatic curve of the optical imaging lens assembly according to example 6, representing a curvature of a tangential plane and a curvature of a sagittal plane. FIG. 12B illustrates a distortion curve of the optical imaging lens assembly according to example 6, representing amounts of distortion corresponding to different image heights. FIG. 12C illustrates a lateral color curve of the optical imaging lens assembly according to example 6, representing deviations of different image heights on an imaging plane after light passes through the lens assembly. It can be seen from FIG. 12A to FIG. 12C that the optical imaging lens assembly provided in example 6 may achieve good image quality.

In view of the above, examples 1 to 6 respectively satisfy the relationship shown in Table 19.

TABLE 19

| Condition/Example | 1 | 2 | 3 | 4 | 5 | 6 |
|---|---|---|---|---|---|---|
| f/EPD | 1.29 | 1.25 | 1.20 | 1.08 | 1.06 | 1.03 |
| ImgH/f | 0.75 | 0.75 | 0.73 | 0.67 | 0.69 | 0.69 |
| f1/(R2 − R1) | 1.91 | 1.87 | 1.78 | 1.01 | 1.03 | 1.08 |
| R3/R4 | 1.39 | 1.38 | 1.38 | 1.37 | 1.37 | 1.36 |
| f3/(R6 − R5) | 1.36 | 1.32 | 1.37 | 1.48 | 1.54 | 1.55 |
| f2/f7 | 0.97 | 1.28 | 0.77 | 0.80 | 0.80 | 0.82 |
| (f6 − f5)/f4 | 0.76 | 0.86 | 0.84 | 0.72 | 0.73 | 0.68 |
| (R11 + R12)/(R13 + R14) | 2.00 | 1.81 | 1.78 | 1.52 | 1.52 | 1.49 |
| (DT11 + DT12)/ImgH | 1.01 | 1.03 | 1.11 | 1.32 | 1.29 | 1.28 |
| T34/T67 | 1.36 | 1.16 | 1.31 | 1.19 | 1.19 | 1.19 |
| ET7/CT7 | 1.63 | 1.54 | 1.40 | 1.34 | 1.27 | 1.26 |
| (CT3 + CT6)/TTL*10 | 2.17 | 2.13 | 2.20 | 2.16 | 2.15 | 2.20 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens and a seventh lens, which have refractive power and are sequentially arranged from an object side to an image side of the optical imaging lens assembly along an optical axis, wherein, the first lens and the third lens both have positive refractive power; the fifth lens has negative refractive power; wherein f/EPD<1.3, where f is a total effective focal length of the optical imaging lens assembly, and EPD is an entrance pupil diameter of the optical imaging lens assembly, and wherein the second lens and the seventh lens both have negative refractive power; and the fourth lens and the sixth lens both have positive refractive power.

2. The optical imaging lens assembly according to claim 1, wherein 0.6<ImgH/f <0.8, where ImgH is half of a diagonal length of an effective pixel area on an imaging plane of the optical imaging lens assembly, and f is the total effective focal length of the optical imaging lens assembly.

3. The optical imaging lens assembly according to claim 1, wherein 1.2<f1/(R2-R1)<2, where f1 is an effective focal length of the first lens, R1 is a radius of curvature of an object-side surface of the first lens, and R2 is a radius of curvature of an image-side surface of the first lens.

4. The optical imaging lens assembly according to claim 1, wherein 1.2<R3/R4 <1.6, where R3 is a radius of curvature of an object-side surface of the second lens, and R4 is a radius of curvature of an image-side surface of the second lens.

5. The optical imaging lens assembly according to claim 1, wherein 1.2<f3/(R6-R5)<1.7, where f3 is an effective focal length of the third lens, R6 is a radius of curvature of an image-side surface of the third lens, and R5 is a radius of curvature of an object-side surface of the third lens.

6. The optical imaging lens assembly according to claim 1, wherein 0.7<f2/f7<1.3, where f2 is an effective focal length of the second lens, and f7 is an effective focal length of the seventh lens.

7. The optical imaging lens assembly according to claim 1, wherein 0.5<(f6-f5)/f4<1.0, where f6 is an effective focal length of the sixth lens, f5 is an effective focal length of the fifth lens, and f4 is an effective focal length of the fourth lens.

8. The optical imaging lens assembly according to claim 1, wherein 1.4<(R11+R12)/(R13+R14)<2.1, where R11 is a radius of curvature of an object-side surface of the sixth lens, R12 is a radius of curvature of an image-side surface of the sixth lens, R13 is a radius of curvature of an object-side surface of the seventh lens, and R14 is a radius of curvature of an image-side surface of the seventh lens.

9. The optical imaging lens assembly according to claim 1, wherein 1<(DT11+DT12)/ImgH<1.5, where DT11 is a maximum effective radius of an object-side surface of the first lens, DT12 is a maximum effective radius of an image-side surface of the first lens, and ImgH is half of a diagonal length of an effective pixel area on an imaging plane of the optical imaging lens assembly.

10. The optical imaging lens assembly according to claim 1, wherein 1.2<ET7/CT7<1.7, where ET7 is an edge thickness of the seventh lens, and CT7 is a center thickness of the seventh lens along the optical axis.

11. The optical imaging lens assembly according to claim 1, wherein each of an object-side surface of the first lens, an object-side surface of the second lens, an object-side surface of the third lens, an object-side surface of the sixth lens and an object-side surface of the seventh lens is convex surface, and each of an image-side surface of the first lens, an image-side surface of the second lens, an image-side surface of the third lens, an image-side surface of the sixth lens and an image-side surface of the seventh lens is concave.

12. The optical imaging lens assembly according to claim 1, wherein 1.1<T34/T67<1.5, where T34 is a spaced interval between the third lens and the fourth lens along the optical axis, and T67 is a spaced interval between the sixth lens and the seventh lens along the optical axis.

13. The optical imaging lens assembly according to claim 1, wherein 2<(CT3+CT6)/TTL*10<2.4, where CT3 is a center thickness of the third lens along the optical axis, CT6 is a center thickness of the sixth lens along the optical axis, and TTL is a distance along the optical axis from an object-side surface of the first lens to an imaging plane of the optical imaging lens assembly.

* * * * *